(12) United States Patent
Choi

(10) Patent No.: US 6,196,089 B1
(45) Date of Patent: Mar. 6, 2001

(54) HUB NUT FASTENER FOR MOUNTING WHEEL

(75) Inventor: Jong-bum Choi, Kyungsang-namdo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/239,055

(22) Filed: Jan. 27, 1999

(51) Int. Cl.[7] .................................................. B25B 13/50
(52) U.S. Cl. ........................................ 81/57.36; 81/57.22
(58) Field of Search ................................ 81/57.22, 57.36

(56) References Cited

U.S. PATENT DOCUMENTS 5,277,085 * 1/1994 Tanimura et al. .................. 81/57.22

* cited by examiner

Primary Examiner—James G. Smith
(74) Attorney, Agent, or Firm—Christie, Parker & Hale, LLP

(57) ABSTRACT

Disclosed is a hub nut fastener including a plurality of nut runners for fastening hub nuts to stud bolts of a wheel hub; nut runner moving means for altering a pitch of the nut runners by drive power of a motor, the nut runner moving means being connected to some of the nut runners through another medium; support means for rotatably supporting the nut runner moving means and fixing one of the nut runners, the support means being fixedly provided within a casing defining an exterior of the hub nut fastener; runner guide means for guiding the nut runners moved by the runner moving means; and digressing nut runner operating means for moving a digressing nut runner away from and back to a circle formed by the remainder of the nut runners.

9 Claims, 9 Drawing Sheets

HUB NUT FASTENER FOR MOUNTING WHEEL

BACKGROUND OF THE INVENTION (a) Field of the Invention

The present invention relates to a hub nut fastener for connecting hub nuts to stud bolts formed on a wheel hub of a vehicle during manufacture. More particularly, the present invention relates to a hub nut fastener which can easily undergo pitch conversion to enable the fastening of hub nuts to either a four or five-bolt configuration.

(b) Description of the Related Art

Improvements are continuously being made in the automation of the vehicle manufacturing process to make the process faster and less complicated, and therefore less costly. The mounting of a tire-and-wheel assembly to the vehicle during vehicle manufacture is no exception.

Mounting holes are provided in the wheel, and stud bolts, formed in a wheel hub, are placed through the mounting holes, after which nuts are fastened to the stud bolts to securely mount the tire-and-wheel assembly to the vehicle. In more detail, the mounting holes are formed in the wheel such that a number and an angle thereof correspond to a number and angle of the stud bolts formed on the wheel hub. When mounting the wheel to the wheel hub, the mounting holes are aligned with the stud bolts then the wheel is directed toward the wheel hub such that an inner surface of the wheel is flush with the wheel hub and ends of the stud bolts protrude a predetermined distance from the mounting holes of the wheel. Following this procedure, the nuts are fastened to the stud bolts until the wheel is firmly mounted to the wheel hub of the vehicle.

In the case of small and compact vehicles, the stud bolts are provided on the wheel hub every 90° such that four stud bolts are formed on the wheel hub, whereas with medium and large-size vehicles the stud bolts are provided every 72° on the wheel hub, thereby providing a total of five stud bolts. Accordingly, a corresponding number of mounting holes, at corresponding positions, are formed in the wheel. Such different configurations for dissimilarly sized vehicles are used since larger vehicles receive more stress than do smaller vehicles, and therefore require a more sturdy attachment of the wheels to the wheel hub.

A hub nut fastener for providing a means of securing the nuts to the stud bolts is generally configured to match either the 4-bolt or 5-bolt configuration. This complicates the manufacturing process since both the hub nut fastener for the 4-bolt and the 5-bolt wheel hub must be provided on the assembly line to enable manufacture of all types of vehicles. This lack of uniformity can slow down the manufacturing process and increases overall manufacturing costs as two separate devices are needed.

With reference to FIGS. 8 and 9, there is provided a hub nut fastener enabling application to both the 4 and 5-bolt wheel hub to remedy such problems. Such a nut fastener includes a first, a second, a third, a fourth and a fifth nut runner 1$a$, 1$b$, 1$c$, 1$d$ and 1$e$ initially provided at intervals of 72° to form a circle. Guide holes 2 are provided for the first, third, fourth and fifth nut runners 1$a$, 1$c$, 1$d$ and 1$e$ such that the nut runners 1$a$, 1$c$, 1$d$ and 1$e$ are able to slide within the guide holes 2 to change position. A direct cylinder 3$a$ is provided at each of the first and third nut runners 1$a$ and 1$c$, and an indirect cylinder 3$b$ is provided in proximity to the fourth and fifth nut runners 1$d$ and 1$e$. The indirect cylinder 3$b$ operates a link 4, which, in turn, operates the fourth and fifth nut runners 1$d$ and 1$e$.

When the cylinders 3$a$ and 3$b$ are in a nonoperating, retracted mode, the nut runners 1$a$, 1$c$, 1$d$ and 1$e$ are maintained at equidistant intervals of 72° as described above and as shown in FIG. 8 (the second nut runner 1$b$ is fixed in a single position). However, when the cylinders 3$a$ and 3$b$ operate by extending, the first, third, fourth and fifth nut runners 1$a$, 1$c$, 1$d$ and 1$e$ change positions to that shown in FIG. 9. That is, with the operation of the cylinders 3$a$ and 3$b$, the first, second, third and fourth nut runners 1$a$, 1$b$, 1$c$ and 1$d$ are positioned at angles of 90° to form a circle, and the fifth nut runner 1$e$ is positioned away from the circle and is not operated for the fastening of nuts.

However, in the prior hub nut fastener as described above, severe wear occurs in both the link 4 and bolts supporting the cylinders 3$a$ and 3$b$ if the nut fastener is frequently changed from a 4-bolt to a 5-bolt structure. Further, by the positioning of the fifth nut runner 1$e$ away from the circle formed by the remaining nut runners 1$a$, 1$b$, 1$c$ and 1$d$ in the case where the hub nut fastener is applied to a 4-bolt wheel hub, damage can occur to the outside surface of the wheel by contact of the fifth nut runner 1$e$ thereon.

SUMMARY OF THE INVENTION

The present invention has been made in an effort to solve the above problems.

It is an object of the present invention to provide a hub nut fastener in which a pitch of the same is easily converted by using both a single nut cylinder to position a nut runner in any location along a predetermined pathway, and a servo motor to rotate an upper plate cam to move three nut runners to different angles such that configuration to correspond to either a 4-bolt or a 5-bolt wheel hub is simply realized.

It is another object of the present invention to provide a hub nut fastener in which an indirect power transmission method is used to rotate a motor, a rotating plate, a connecting pin and a rotating panel such that overall structural strength of the hub nut fastener is improved.

To achieve the above objects, the present invention provides a hub nut fastener including a plurality of nut runners for fastening hub nuts to stud bolts of a wheel hub; nut runner moving means for altering a pitch of the nut runners by drive power of a motor, the nut runner moving means being connected to some of the nut runners through another medium; support means for rotatably supporting the nut runner moving means and fixing one of the nut runners, the support means being fixedly provided within a casing defining an exterior of the hub nut fastener; runner guide means for guiding the nut runners moved by the runner moving means; and digressing nut runner operating means for moving a digressing nut runner away from and back to a circle formed by the remainder of the nut runners.

According to a feature of the present invention, the runner moving means includes a rotating plate having a center hole through which the nut runners pass through, the rotating plate being connected to the nut runners through another medium; a ring gear fixedly connected to and protruding from a circumference of the rotating plate; and a motor meshing with the ring gear and rotating the rotating plate.

According to another feature of the present invention, the rotating plate includes a guide groove integrally extending from the center hole a predetermined distance toward a circumference of the rotating plate, the digressing nut runner moving into the guide groove to digress from the circle formed by the remainder of the nut runners; and first, second and third pin holes formed at predetermined intervals partially surrounding the center hole, the first pin hole being circular, and the second and third pin holes being oblong and extending respectively 18° and 36° along an imaginary circle formed by centers of the first, second and third pin holes.

According to yet another feature of the present invention, a center of the first pin hole is formed 72° along the circle formed by the pin holes from a clockwise end of the guide groove, a counterclockwise end of the second pin hole is formed 90° from the center of the first pin hole and the second pin hole extends its 18° in the clockwise direction from its counterclockwise end, and a counterclockwise end of the third pin hole is formed 90° from the counterclockwise end of the second pin hole and the third pin hole extends its 36° in the clockwise direction from its counterclockwise end.

According to still yet another feature of the present invention, gear teeth are formed on a portion of a circumference of the ring gear.

According to still yet another feature of the present invention, the support means includes a fixed plate including an axle hole provided in a center of the fixed plate; first, second and third runner holes formed around the axle hole and inside of which the nut runners are able to undergo movement; and fourth, fifth and sixth pin holes formed around the runner holes at positions corresponding respectively to the first, second and third pin holes of the rotating plate when the rotating plate is stacked on the fixed plate.

According to still yet another feature of the present invention, the first runner hole extends along an imaginary circle formed by the first, second and third runner holes over a distance of 126°, and has a guide hole integrally formed therefrom and extending toward a circumference of the fixed plate, the guide hole corresponding to a position of the guide groove of the rotating plate when the rotating plate is stacked on the fixed plate; the second runner hole is oblong and a counterclockwise end of the second runner hole is formed 72° along the circle formed by the runner holes from a counterclockwise end of the first runner hole; and the third runner hole is circular and a center of the third runner hole is positioned along the circle formed by the runner holes 72° from the counterclockwise end of the second runner hole.

According to still yet another feature of the present invention, the fourth pin hole is oblong and a clockwise end of the same is positioned corresponding to a clockwise end of the first runner hole before the formation of the guide hole, and the fourth pin hole extends counterclockwise 54° along an imaginary circle formed by the pin holes; a counterclockwise end of the fifth pin hole is provided 72° from a counterclockwise end of the fourth pin hole, and the fifth pin hole extends clockwise 36° from its counterclockwise end along the imaginary circle formed by the pin holes; and a counterclockwise end of the sixth pin hole is positioned 72° from the counterclockwise end of the fifth pin hole, and the sixth pin hole extends clockwise 18° from its counterclockwise end along the imaginary circle formed by the pin holes.

According to still yet another feature of the present invention, the runner guide means includes first, second and third connecting pins inserted respectively in pairs of the first and fourth pin holes, the second and fifth pin holes, and the third and sixth pin holes; first, second and third links center portions thereof being connected respectively to the first, second and third connecting pins, and inner ends of the first, second and third links converging to be hingedly fixed to a fixing bolt which is connected to the axle hole of the fixed plate; and first, second and third link bearings provided respectively on outer ends of the first, second and third links, the first, second and third link bearings being interposed between the links and a guide rod formed on a back surface of the fixed plate.

DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
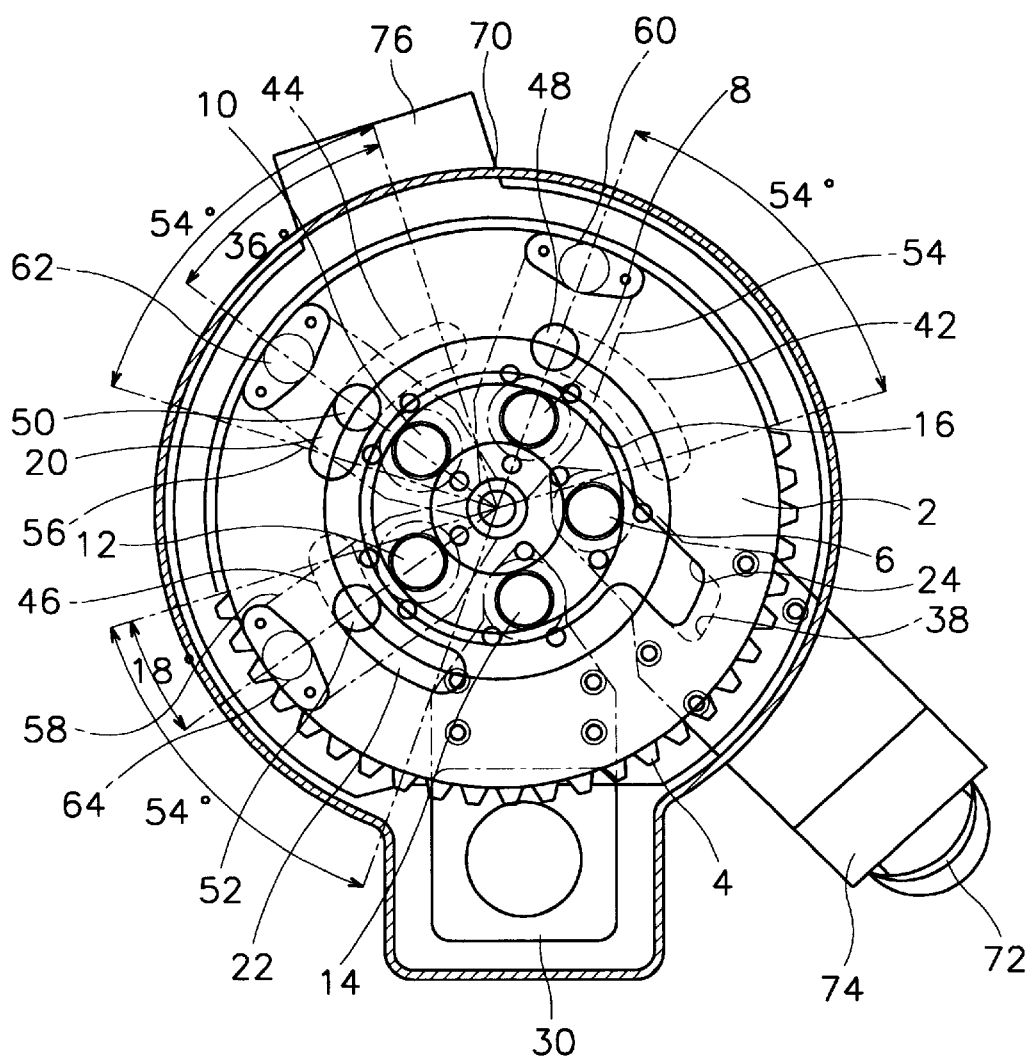
FIG. 1 is a front sectional view of a hub nut fastener according to a preferred embodiment of the present invention.

Preferred embodiments of the present invention will now be described in detail with reference to the accompanying drawings. Certain terminology will be used in the following description for convenience and reference only and will not be limiting. The words "clockwise", "counterclockwise", "right", "left", etc. will designate directions in the drawings to which reference is made.

Figure 2:
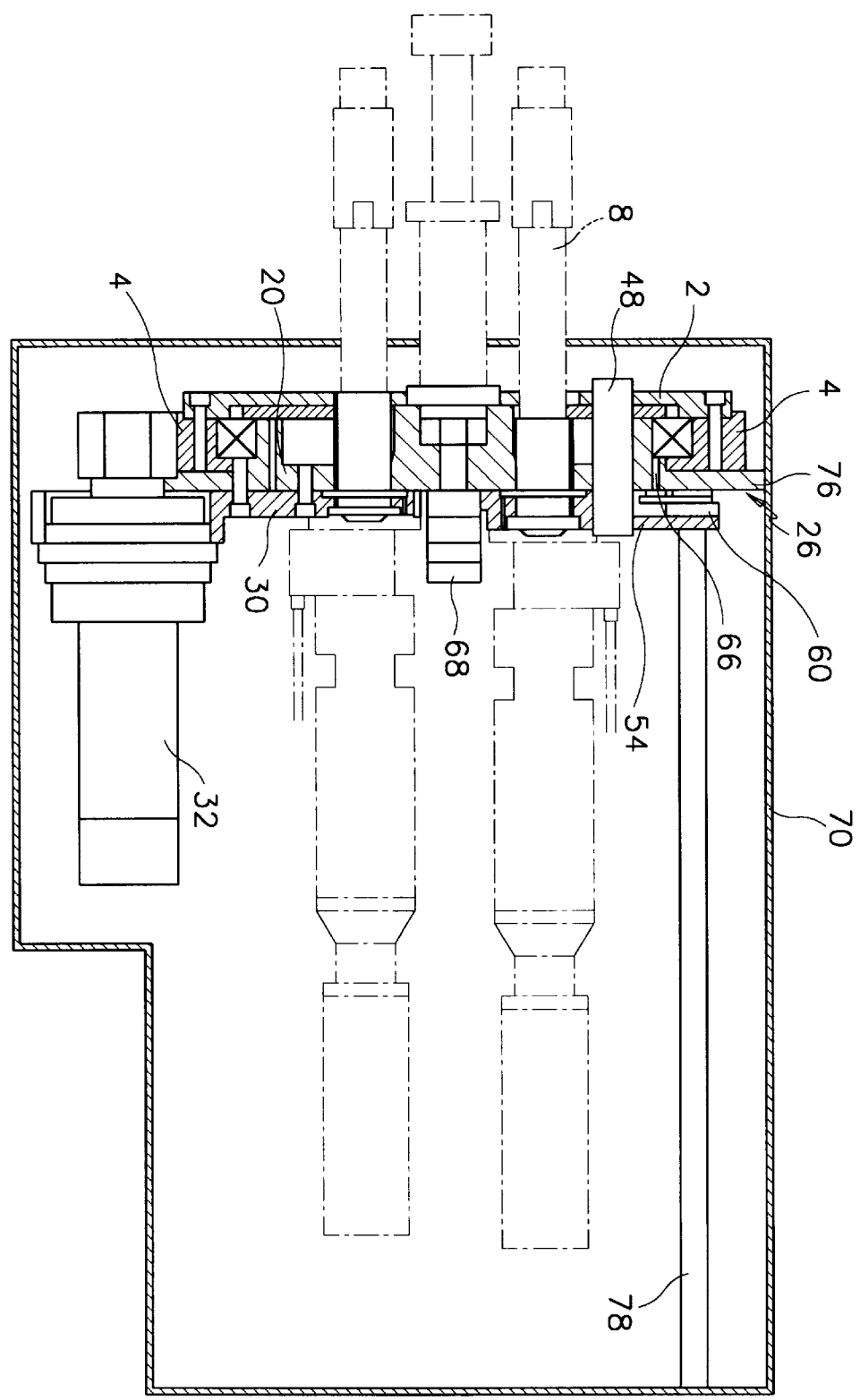
FIG. 2 is a side sectional view of a hub nut fastener according to a preferred embodiment of the present invention.

FIGS. 1 and 2 respectively show a front sectional view and a side sectional view of a hub nut fastener according to a preferred embodiment of the present invention. In the drawings, reference numeral 2 indicates a rotating plate.

Figure 3:
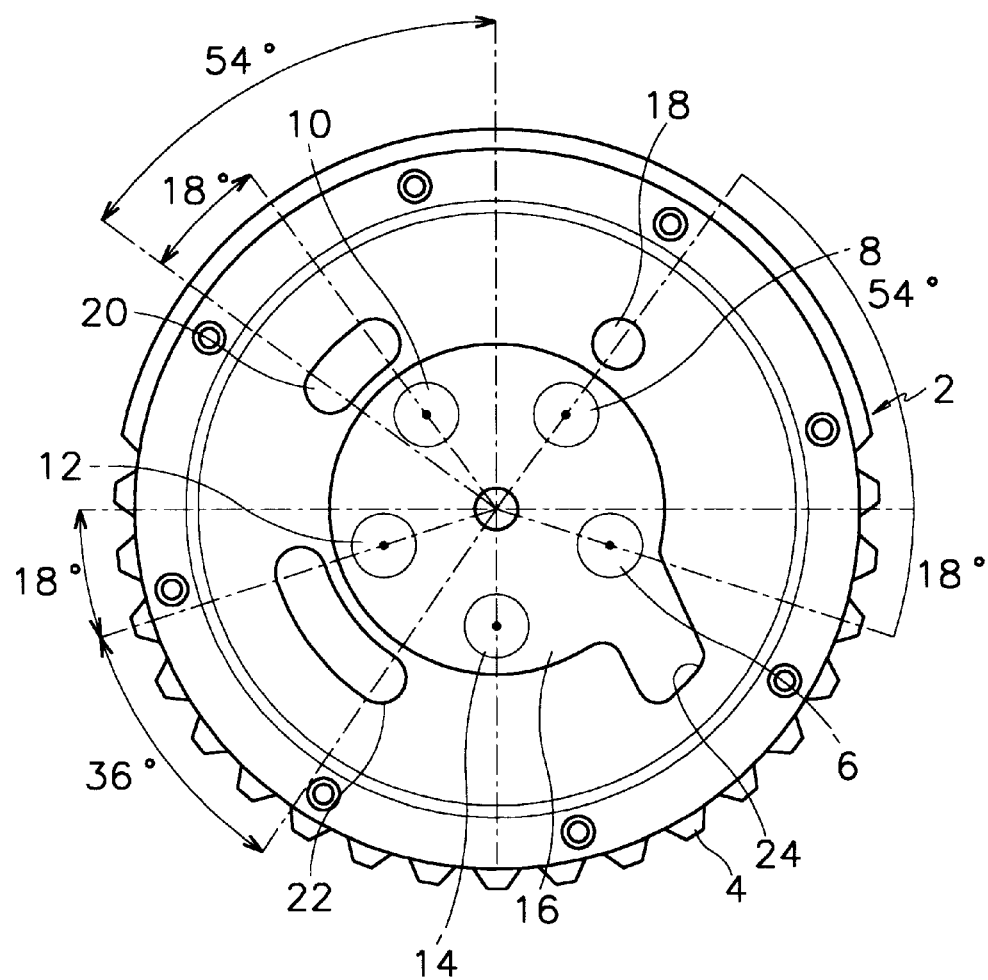
FIG. 3 is a front view of a rotating plate shown in FIG. 1.

The rotating plate 2, with reference also to FIG. 3, is substantially circular having a predetermined thickness, and a ring gear 4 is fixedly provided behind and protruding from an outer circumference of the rotating plate 2. Gear teeth are formed over approximately half a circumference of the ring gear 4. Further, formed in a center of the rotating plate 2 is a center hole 16 which has a large diameter. First, second, third, fourth and fifth nut runners 6, 8, 10, 12 and 14 pass through the center hole 16 at intervals of 72°. A guide groove 24 is integrally formed extending from the center hole 16 in proximity to a position corresponding to where the first runner 6 passes through the center hole 16, the guide groove 24 extending a predetermined distance toward the circumference of the rotating plate 2.

First, second and third pin holes 18, 20 and 22 are formed in the rotating plate 2 at predetermined intervals to partially surround the center hole 16. The first pin hole 18 is circular having a predetermined diameter, and is provided corresponding to a position of the second nut runner 8, i.e. a center of the first pin hole 18 is provided 72° in a counterclockwise direction from the first nut runner 6. The second pin hole 20 is oblong and slightly curved following a circumference of the center hole 16, and an extreme counterclockwise end of the second pin hole 20 (corresponding to where a center of a circular element is located when positioned therein) is provided 90° in a counterclockwise direction from the first pin hole 18. The second pin hole 20 extends 18° in the clockwise direction from its counterclockwise end. The third pin hole 22 is also oblong and slightly curved following a circumference of the center hole 16, and a counterclockwise end of the third pin hole 22 is provided 90° in a counterclockwise direction from the counterclockwise end of the second pin hole 20. The third pin hole 22 extends 36° in the clockwise direction from its counterclockwise end.

Figure 4:
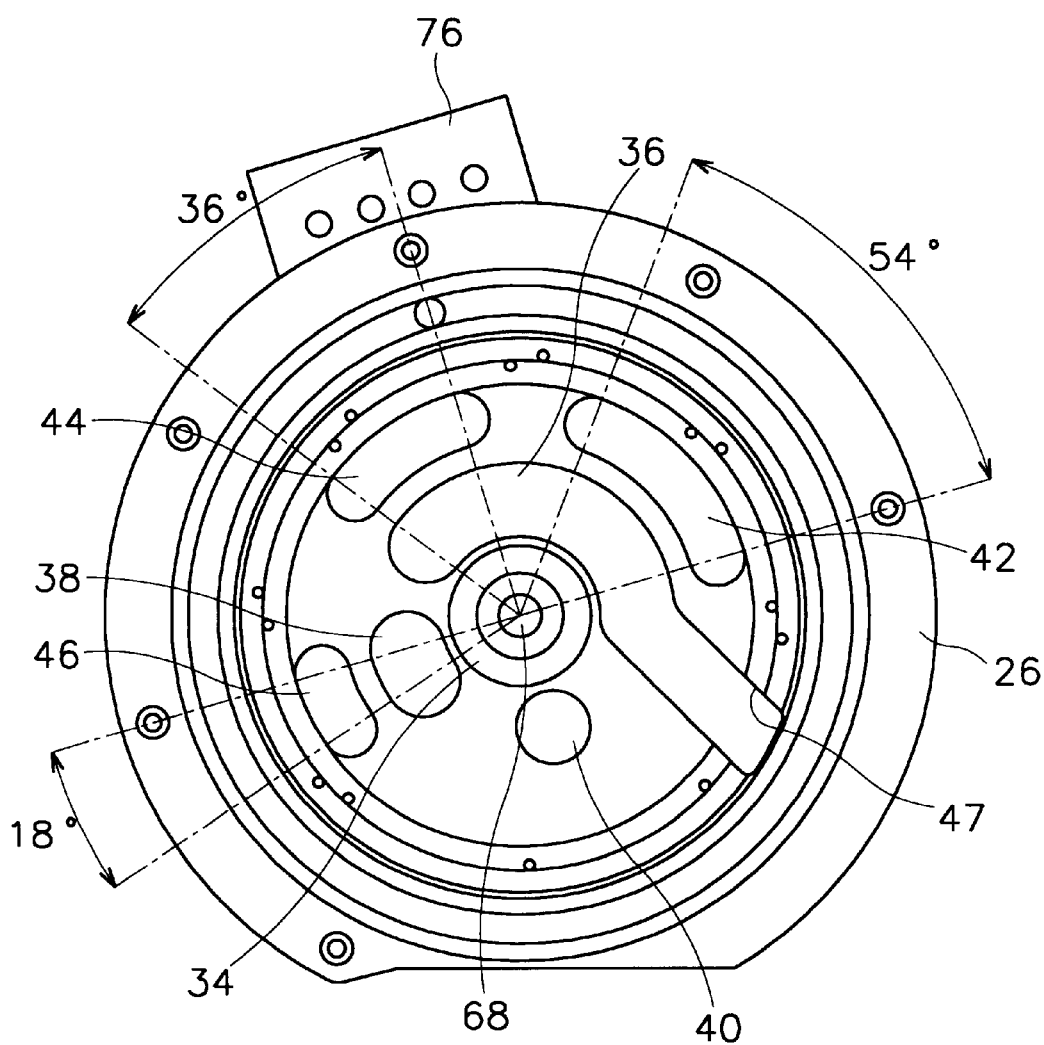
FIG. 4 is a front view of a fixing plate shown in FIG. 1.

Provided behind the rotating plate 2, with reference also to FIG. 4, is a fixed plate 26. The fixed plate 26 includes a bearing 28 joined to an inner circumference of the ring gear 4 connected to the rotating plate 2. A bracket 30, which supports a motor 32 (see FIG. 2) is fixedly connected behind the fixed plate 26. The motor 32 is meshed with the gear teeth of the ring gear 4 such that the rotating plate 2 is rotated by operation of the motor 32. An axle hole 34 is formed in a center of the fixed plate 26.

First, second and third runner holes 36, 38 and 40 are formed surrounding the axle hole 34. Further, formed between the runner holes 36, 38 and 40 and the bearing 28 are fourth, fifth and sixth pin holes 42, 44 and 46. The first runner hole 36 extends around the axle hole 34 such that the first, second and third nut runners 6, 8 and 10 can be positioned therein, and includes a guide hole 47 corresponding to the position of the guide groove 24 of the center hole 16 of the rotating plate 2. An extreme counterclockwise end of the second runner hole 38 (corresponding to where a center of a circular element is located when positioned therein) is positioned 72° counterclockwise from an extreme counterclockwise end of the first runner hole 36, and the second runner hole 38 extends 18° from its counterclockwise end. The third runner hole 40 is circular and a center of the same is positioned 72° from the extreme counterclockwise end of the second runner hole 38.

The fourth, fifth and sixth pin holes 42, 44 and 46, as described above, are provided between the bearing 28 and the first, second and third runner holes 36, 38 and 40, the fourth, fifth and sixth pin holes 42, 44 and 46 being oblong and curving along an inner circumference of the bearing 28. The fourth pin hole 42 is formed at a position corresponding to the first runner hole 36 and extends 54° in a counterclockwise direction starting from a clockwise end of the first runner hole 36 before the formation of the guide hole 47. The fifth pin hole 44 is also formed at a position corresponding to the first runner hole 36 and extends 36° in a clockwise direction starting from the counterclockwise end of the first runner hole 36, a counterclockwise end of the fifth pin hole 44 being 72° from a counterclockwise end of the fourth pin hole 42, and a clockwise end of the fifth pin hole 44 being 90° from a clockwise end of the fourth pin hole 42. The sixth pin hole 46 is formed at a position corresponding to the second runner hole 38 such that the clockwise end of the fifth pin hole 44 is 90° from a clockwise end of the sixth pin hole 46, the sixth pin hole 46 extending 18° in a counterclockwise direction from its clockwise end.

With the configuration described above, the center hole 16 of the rotating plate 2 corresponds to the position of the first, second and third runner holes 36, 38 and 40 of the fixed plate 26; and the first, second and third pin holes 18, 20 and 22 of the rotating plate 2 correspond to the position of the fourth, fifth and sixth pin holes 42, 44 and 46 of the fixed plate 26. Further, the nut runners 6, 8, 10, 12 and 14 are inserted in the cavity provided by the former combination, and first, second and third connecting pins 48, 50 and 52 are inserted in the cavities by the latter combination. Here, the first nut runner 6 is able to digress from the circle formed by the remainder of the nut runners 8, 10, 12 and 14; the second, third and fourth nut runners 8, 10 and 12 are able to move along the circle within the first and second runner holes 36 and 38; and the fifth nut runner 14 remains stationary in its insertion into the third runner hole 40.

Figure 5:
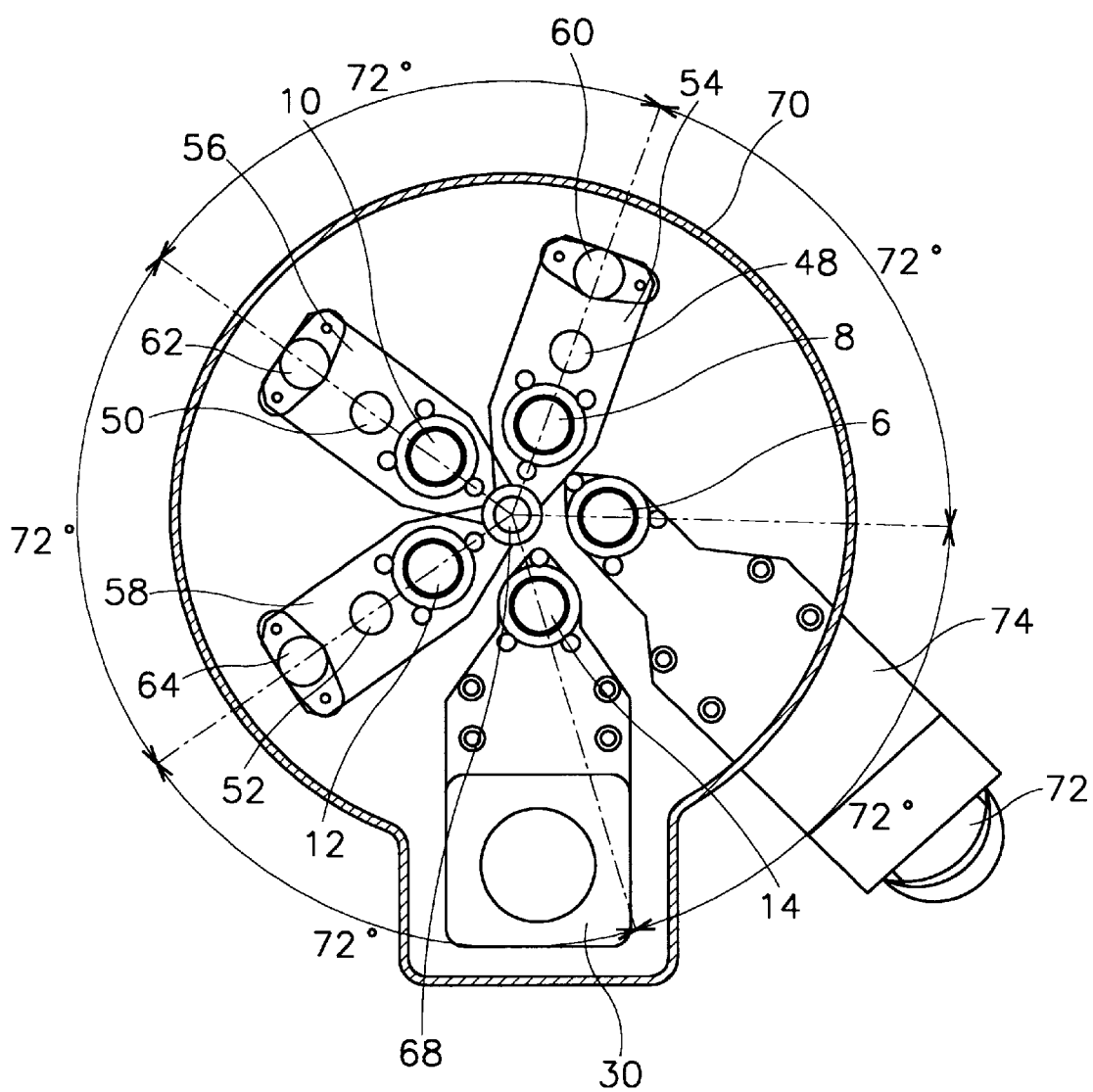
FIG. 5 is a front view of a nut runner supporter shown in FIG. 1.

Referring to FIG. 5, the first, second and third connecting pins 48, 50 and 52, each of which is inserted respectively in the first and fourth pin holes 18 and 42, the second and fifth pin holes 20 and 44, and the third and sixth pin holes 22 and 46, are fixed to first, second and third links 54, 56 and 58, respectively. First, second and third link bearings 60, 62 and 64 are mounted respectively to outer ends of the first, second and third links 54, 56 and 58. The link bearings 60, 62 and 64 connect with a guide rod 66 formed under the fixed plate 26 (see FIG. 2) such that the rotating plate 2 does not vibrate nor lean to one side during its rotation.

Inner ends of the first, second and third links 54, 56 and 58 converge at one location to be hingedly fixed to a fixing bolt 68 provided in the axle hole 34 of the fixed plate 26. The movable second, third and fourth nut runners 8, 10 and 12 are fixed to the first, second and third links 54, 56 and 58, respectively, at a position respectively between the connecting pins 48, 50 and 52 and the fixing bolt 68. The first nut runner 6 is connected to a clamp 74, the clamp 74 being connected to an end of a piston of a cylinder 72 hingedly fixed to a cover 70 (see FIG. 2) of the inventive hub nut fastener. By the expansion and contraction operation of the cylinder 72, the first nut runner 6 is inserted and separated from the first runner hole 36. The fixed fifth nut runner 14 is fixedly connected to the bracket 30 which supports the motor 32 and is connected behind the fixed plate 26 as described above (see FIG. 2).

Further, with reference to FIGS. 2 and 4, to secure the fixed plate 26 in a stationary state, a portion of the fixed plate 26 is protruded in a direction toward the cover 70 to form an extended portion 67, and a fixing bar 78 extends vertically from the extended portion 67 to an opposing end of the cover 70 to be fixed thereto.

Figure 6:
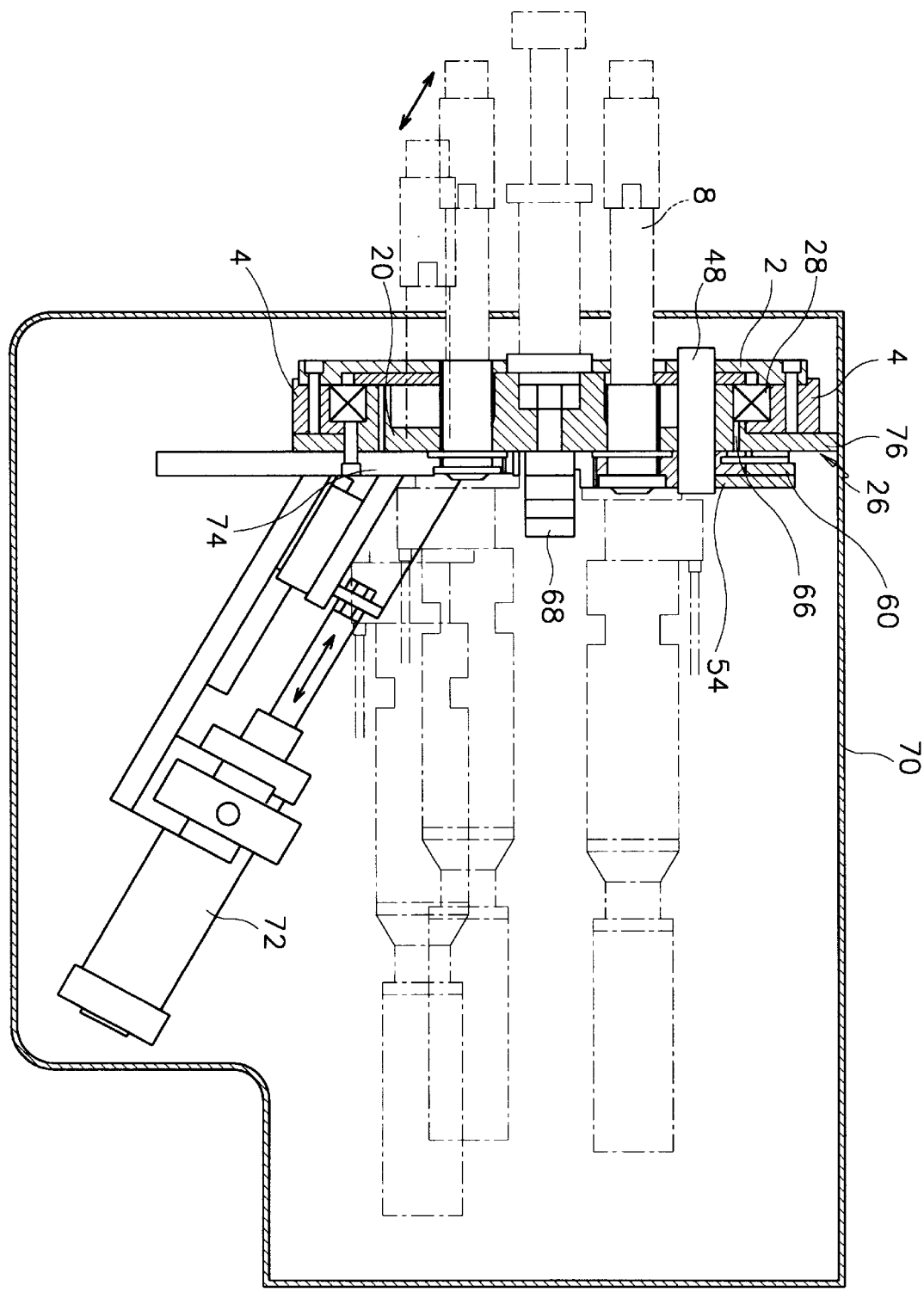
FIGS. 6 and 7 are respectively a side sectional view and a front sectional view of the hub nut fastener shown in FIG. 1 used to describe the operation of the same.
Figure 7:
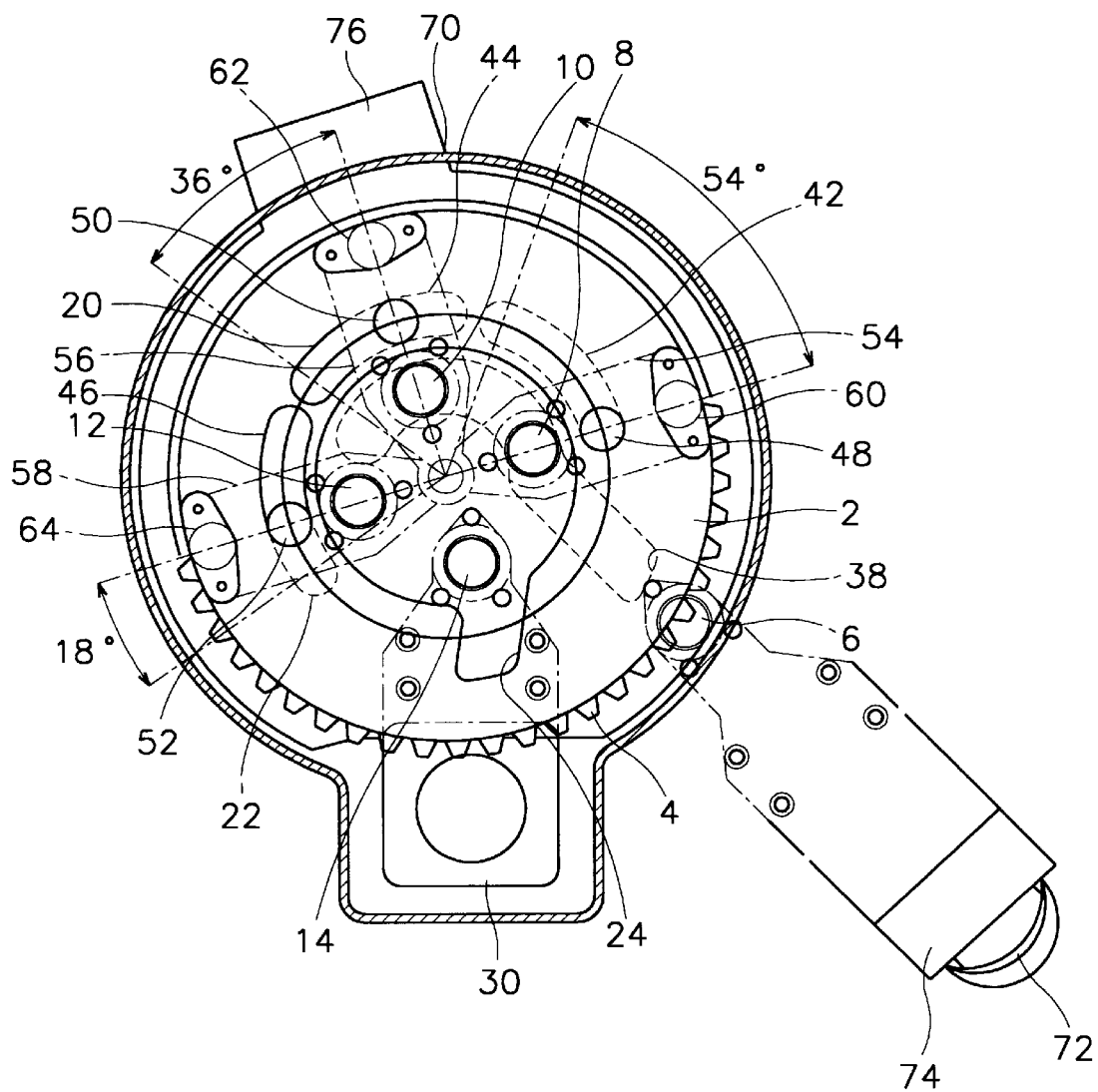
Figure 8:
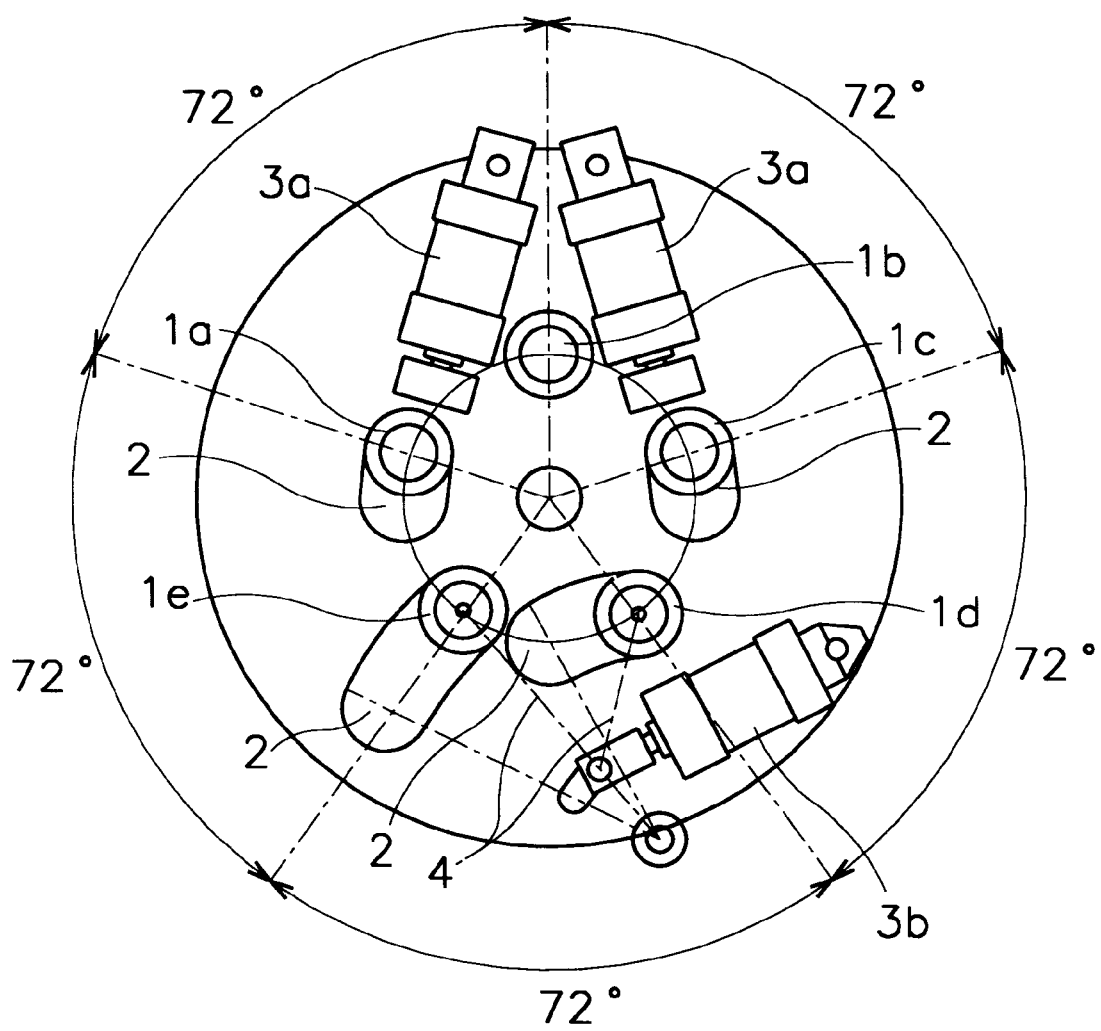
FIGS. 8 and 9 are front sectional views of a conventional hub nut fastener.
Figure 9:
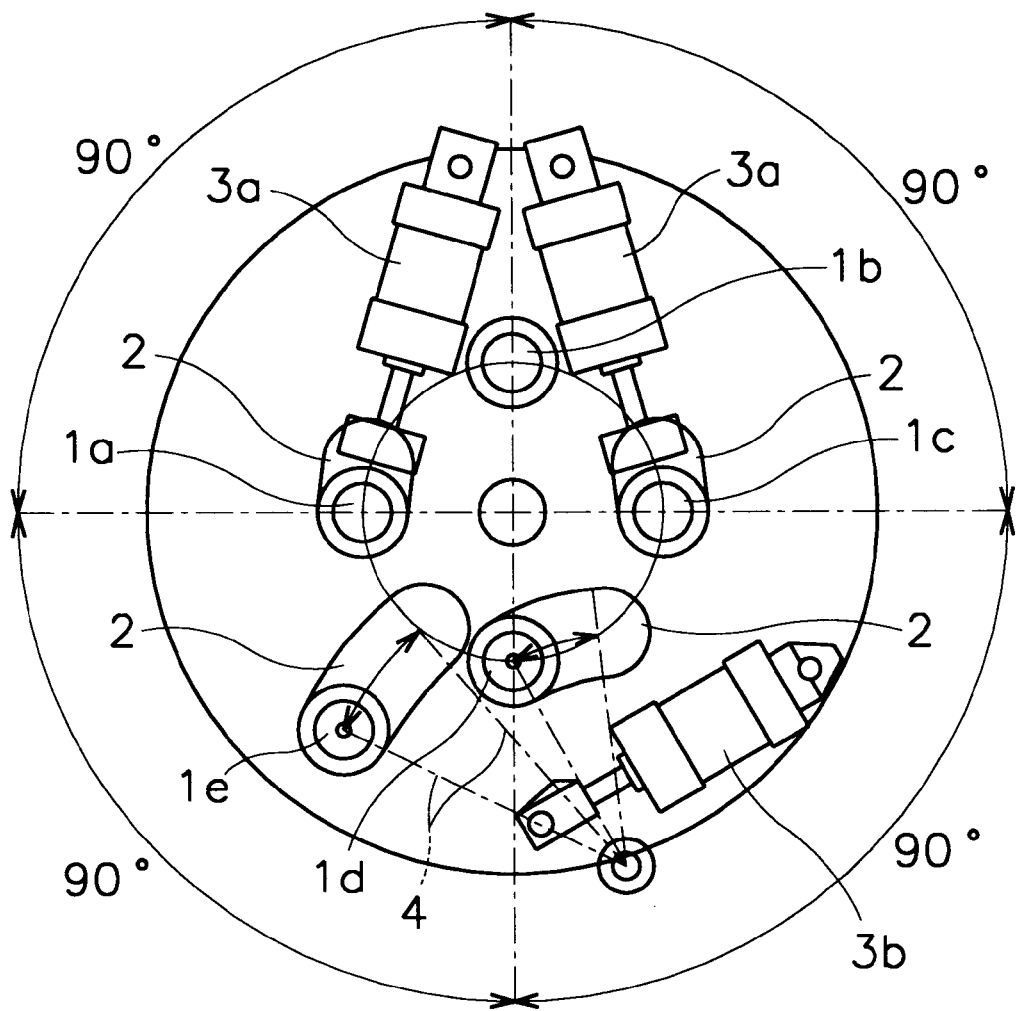

FIGS. 6 and 7 are respectively a side sectional view and a front sectional view of the inventive hub nut fastener shown in FIG. 1. With regard to the altering of the present invention to correspond to 4 and 5-bolt wheel hub configurations, starting from a state corresponding to a 5-bolt configuration as shown in FIG. 1, if the cylinder 72 contracts, the first nut runner 6 follows the guide groove 24 of the center hole 16, provided in the rotating plate 2, and the guide hole 47 of the first runner hole 36, provided in the fixed plate 26, in an outward direction. After the first nut runner 6 is positioned away from the remaining nut runners 8, 10, 12 and 14, the motor 32 operates such that the rotating plate 2 is rotated in the clockwise direction.

As a result, the first connecting pin 48 inserted in the first pin hole 18 of the rotating plate 2 moves together with the rotating plate 2 in the clockwise direction 18° such that the second and third connecting pins 50 come to be positioned to the counterclockwise ends of the second and third pin hole 20 and 22, respectively. With the rotation of the rotating plate 2, if the first, second and third connecting pins 48, 50 and 52 rotate a maximum of 36°, the first, second and third links 54, 56 and 58, joined respectively to the first, second and third connecting pins 48, 50 and 52, pivot on the fixing bolt 68 in the clockwise direction.

If the first, second and third links 54, 56 and 58 are rotated through the above process, the second, third and fourth nut runners 8, 10 and 12 are also rotated. At this time, the first connecting pin 48 moves 54° clockwise along the entire length of the fourth pin hole 42 of the fixed plate 26, the second connecting pin 50 moves 36° clockwise along the entire length of the fifth pin hole 44 of the fixed plate 26, and the third connecting pin 52 moves 18° along the entire length of the sixth pin hole 46 of the fixed plate 26. Accordingly, the first, second and third links 54, 56 and 58 also rotate to amounts corresponding to the first, second and third connecting pins 48, 50 and 52, respectively.

As a result of the above, the second, third and fourth nut runners 8, 10 and 12, supported respectively by the first, second and third links 54, 56 and 58, also rotate to these amounts such that the second, third and fourth nut runners 8, 10 and 12 are spaced at 90° intervals. This configuration corresponds to a vehicle having four stud bolts formed on its wheel hub.

By the operation of the motor 32 in the opposite direction, the rotating plate 2 rotates counterclockwise 54° such that the opposite operation as that described occurs. That is, by the counterclockwise rotation of the rotating plate 2, the connecting pins 48, 50 and 52 begin to move in a counterclockwise direction to the counterclockwise ends of the fourth and fifth pin hole 42 and 44, and a counterclockwise end of the sixth pin hole 46 of the fixed plate 26.

In the above state, the first nut runner 6 returns to its original position by the extension of the cylinder 72 such that a 72° interval is provided between each of the nut runners 6, 8, 10, 12 and 14 as shown in FIG. 5. As a result, the configuration of the inventive hub nut fastener is changed back to that corresponding to a vehicle having five stud bolts formed on its wheel hub.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hub nut fastener comprising:
    a plurality of nut runners for fastening hub nuts to stud bolts of a wheel hub wherein one of said plurality of nut runners is a digressing nut runner:
    nut runner moving means for altering a pitch of a plurality of nut runners;
    support means for rotatably supporting the nut runner moving means and fixing one of the nut runners, the support means being fixedly provided within a casing defining an exterior of the hub nut fastener;
    runner guide means for guiding the nut runners moved by the runner moving means; and
    digressing nut runner operating means for moving the digressing nut runner away from and back to a circle formed by the remainder of the nut runners.

2. The hub nut fastener of claim 1 (wherein the nut runner moving means) comprises:
    a rotating plate having a center hole through which the nut runners pass through, the rotating plate being connected to the nut runners through another medium;
    a ring gear fixedly connected to and protruding from a circumference of the rotating plate; and
    a motor meshing with the ring gear and rotating the rotating plate.

3. The hub nut fastener of claim 2 wherein the rotating plate comprises:
    a guide groove integrally extending from the center hole a predetermined distance toward a circumference of the rotating plate, the digressing nut runner moving into the guide groove to digress from the circle formed by the remainder of the nut runners; and
    first, second and third pin holes formed at predetermined intervals partially surrounding the center hole, the first pin hole being circular, and the second and third pin holes being oblong and extending respectively 18° and 36° along an imaginary circle formed by centers of the first, second and third pin holes.

4. The hub nut fastener of claim 3 wherein a center of the first pin hole is formed 72° along the circle formed by the pin holes from a clockwise end of the guide groove, a counterclockwise end of the second pin hole is formed 90° from the center of the first pin hole and the second pin hole extends its 18° in the clockwise direction from its counterclockwise end, and a counterclockwise end of the third pin hole is formed 90° from the counterclockwise end of the second pin hole and the third pin hole extends its 36° in the clockwise direction from its counterclockwise end.

5. The hub nut fastener of claim 2 wherein gear teeth are formed on a portion of a circumference of the ring gear.

6. The hub nut fastener of claim 3 wherein the support means comprises a fixed plate including an axle hole provided in a center of the fixed plate; first, second and third runner holes formed around the axle hole and inside of which the nut runners are able to undergo movement; and fourth, fifth and sixth pin holes formed around the runner holes at positions corresponding respectively to the first, second and third pin holes of the rotating plate when the rotating plate is stacked on the fixed plate.

7. The hub nut fastener of claim 6 wherein the first runner hole extends along an imaginary circle formed by the first, second and third runner holes over a distance of 126°, and has a guide hole integrally formed therefrom and extending toward a circumference of the fixed plate, the guide hole corresponding to a position of the guide groove of the rotating plate when the rotating plate is stacked on the fixed plate; the second runner hole is oblong and a counterclockwise end of the second runner hole is formed 72° along the circle formed by the runner holes from a counterclockwise end of the first runner hole; and the third runner hole is circular and a center of the third runner hole is positioned along the circle formed by the runner holes 72° from the counterclockwise end of the second runner hole.

8. The hub nut fastener of claim 7 wherein the fourth pin hole is oblong and a clockwise end of the same is positioned corresponding to a clockwise end of the first runner hole before the formation of the guide hole, and the fourth pin hole extends counterclockwise 54° along an imaginary circle formed by the pin holes; a counterclockwise end of the fifth pin hole is provided 72° from a counterclockwise end of the fourth pin hole, and the fifth pin hole extends clockwise 36° from its counterclockwise end along the imaginary circle formed by the pin holes; and a counterclockwise end of the sixth pin hole is positioned 72° from the counterclockwise end of the fifth pin hole, and the sixth pin hole extends clockwise 18° from its counterclockwise end along the imaginary circle formed by the pin holes.

9. The hub nut fastener of claim 8 wherein the runner guide means comprises:
    first, second and third connecting pins inserted respectively in pairs of the first and fourth pin holes, the second and fifth pin holes, and the third and sixth pin holes;
    first, second and third links center portions thereof being connected respectively to the first, second and third connecting pins, and inner ends of the first, second and third links converging to be hingedly fixed to a fixing bolt which is connected to the axle hole of the fixed plate; and
    first, second and third link bearings provided respectively on outer ends of the first, second and third links, the first, second and third link bearings being interposed between the links and a guide rod formed on a back surface of the fixed plate.

\* \* \* \* \*